United States Patent [19]

Amano et al.

[11] Patent Number: 5,715,103
[45] Date of Patent: Feb. 3, 1998

[54] NEUTRAL DENSITY (ND) FILTER

[75] Inventors: Sayoko Amano, Kawasaki; Mitsuharu Sawamura, Yokohama; Susumu Abe, Utsunomiya, all of Japan

[73] Assignee: Canon Kabushiki Kaisha, Tokyo, Japan

[21] Appl. No.: 651,512

[22] Filed: May 22, 1996

Related U.S. Application Data

[63] Continuation of Ser. No. 286,330, Aug. 5, 1994, abandoned.

[30] Foreign Application Priority Data

Aug. 26, 1993 [JP] Japan ................................ 5-234098

[51] Int. Cl.$^6$ .................. G02B 5/22; G02B 5/28; G02B 1/10
[52] U.S. Cl. .................. 359/888; 359/885; 359/589; 359/580
[58] Field of Search ................... 359/885, 888, 359/890, 891, 892, 585, 586, 588, 589; 428/426

[56] References Cited

U.S. PATENT DOCUMENTS

| | | | |
|---|---|---|---|
| 4,128,303 | 12/1978 | Onoki et al. | 359/588 |
| 4,793,669 | 12/1988 | Perilloux | 359/890 |
| 4,940,636 | 7/1990 | Brock et al. | 428/426 |
| 5,246,803 | 9/1993 | Hanrahan et al. | 359/885 |

FOREIGN PATENT DOCUMENTS

| | | |
|---|---|---|
| 52-113236 | 9/1977 | Japan . |
| 57-195207 | 11/1982 | Japan . |
| 59-38701 | 3/1984 | Japan . |
| 61-183604 | 8/1986 | Japan . |
| 593811 | 4/1993 | Japan . |

*Primary Examiner*—Paul M. Dzierzynski
*Assistant Examiner*—Audrey Chang
*Attorney, Agent, or Firm*—Fitzpatrick, Cella, Harper & Scinto

[57] ABSTRACT

A thin-film-type ND filter which attenuates the amount of light transmission is formed on a transparent substrate by using two or more types of metallic oxide having a refractive index n and an attenuation coefficient k which are in the range of 1.0 to 3.0 in the wavelength region of the visible region, making it possible to obtain flat transmittance characteristics.

6 Claims, 11 Drawing Sheets

NEUTRAL DENSITY (ND) FILTER

This application is a continuation of application Ser. No. 08/286,330, filed Aug. 5, 1994, now abandoned.

BACKGROUND OF THE INVENTION

1. Field of the Invention

The present invention relates to a thin-film-type neutral density (ND) filter and a method of manufacturing the same. More particularly, the present invention relates to a thin-film-type ND filter having a uniform transmittance over the entire visible region and also having excellent durability, and a method of manufacturing the same.

2. Description of the Related Art

In a photographic system, hitherto, when the brightness of an object is too high, light in a predetermined or more amount may enter the photosensitive surface even if the diaphragm is closed to a minimum diameter (the aperture diameter is made to a minimum). Therefore, an ND filter is often mounted in a part of the photographic system in order to regulate the amount of light incident onto the photosensitive surface.

As regards the spectral characteristics of the ND filter, it is necessary for the ND filter to have a uniform transmittance over the entire visible region from the point of view of merely decreasing the amount of incident light. Glass filters produced by putting an absorbing substance in a glass (transparent substrate) and dissolving it, or sheet filters which are made in the form of a film by applying pigment are widely used as an ND filter.

However, these ND filters have a problem in that the spectral characteristics are not uniform (neutral) over the entire visible region, and a durability problem such that spectral characteristics are changed or the exterior becomes abnormal after a long period of use.

A filter having a protective film overcoated on a metallic film to solve the above-described problems, and a filter formed of multiple layers of a metallic film and a dielectric film are known as a thin-film-type ND filter.

For example, in Japanese Patent Laid-Open No. 52-113236, an ND filter is disclosed in which Ti or Cr is used as a metallic film, an $MgF_2$ film is used as a dielectric film, and a plurality of these layers are laminated, thereby producing an antireflection effect. In Japanese Patent Laid-Open No. 57-195207, an ND filter is disclosed which has an antireflection effect by providing a plurality of layers formed of a metallic film and a dielectric film so that they face each other with the dielectric film as the center. Also, in Japanese Patent Laid-Open Nos. 59-38701 and 61-183604, an ND filter is disclosed which is obtained by using Ni as a metallic film and combining it with a dielectric film and has an antireflection effect.

In addition, in Japanese Patent Laid-Open No. 5-93811, an ND filter is disclosed which has an antireflection effect, in which a Ti film is used as a metallic film, an $MgF_2$ film and an $SiO_2$ film are used as a dielectric film, and a crack in the film is prevented by using, in particular, an $SiO_2$ film. The above filter achieves excellent characteristics by laminating a plurality of layers of a metallic film and a dielectric film with a view to obtaining flat transmittance characteristics and antireflection characteristics for preventing ghost flare.

However, since a metallic film is used in all of the above cases, the geometric thickness of each layer of the metallic film is exceedingly small in order to obtain transmittance characteristics and antireflection characteristics by lamination with the dielectric film. As is proposed in each publication described above, a layer, 1 to 10 nm thick, in particular, several nm, formed of Ti, Cr or Ni must be widely used.

Therefore, as shown in FIG. 1, the transmittance of a metallic film (Ti, Cr) is exceedingly sensitive to its thickness. When, in particular, the thickness of each layer is controlled in the above-described manner, control is difficult because the thickness is small, making it impossible to obtain flat transmittance characteristics with a high degree of reproducibility.

Also, since a metallic film is used, there are drawbacks that each transmittance characteristic in accordance with the thickness of the metallic film is inclined on the basis of the specific reflectance and the attenuation coefficient thereof, and it is difficult in the construction of a plurality of layers of the metallic film and the dielectric film to improve the transmittance characteristics and the antireflection characteristics within the target of each transmittance.

SUMMARY OF THE INVENTION

Accordingly, it is an object of the present invention to provide an ND filter having high durability which solves the above-described drawbacks by appropriately selecting a new absorbing material and a film structure, and to provide a method of manufacturing the same filter.

It is another object of present invention to provide an thin-film-type ND filter from which uniform spectral characteristics, for example, uniform transmittance, can be obtained over the entire visible region by appropriately selecting a substance to be vapor deposited on a transparent substrate, which film has durability and an excellent antireflection effect, also serving as a multilayer antireflection film, and to provide a method of manufacturing the same filter.

It is a further object of present invention to provide a method of manufacturing a thin-film-type ND filter, the method including the steps of: forming a dielectric layer of a multilayer antireflection film by using a material selected from the group consisting of $Al_2O_3$, $SiO_2$ and $MgF_2$, the final layer in contact with the air side being an $MgF_2$ layer, in a condition in which the temperature of a transparent substrate is 150° C. or above when flat transmittance characteristics are to be obtained since a thin-film-type ND filter which attenuates the amount of light transmission is formed on a transparent substrate by using two or more types of metallic oxides having a refractive index n and an attenuation coefficient k which are in the range of 1.0 to 3.0 in the wavelength region of the visible region.

According to one aspect of the present invention, there is provided a thin-film-type ND filter which attenuates the amount of light transmission formed on a transparent substrate by using two or more types of metallic oxides having a refractive index n and an attenuation coefficient k which are in the range of 1.0 to 3.0 in the wavelength region of the visible region, thus the film has flat transmittance characteristics.

According to another aspect of the present invention, the two or more types of metallic oxides is a combination of titanium oxide, the obverse surface reflection characteristics and the reverse surface reflection characteristics of the ND filter are reduced by forming a multilayer film of two or more layers, including the metallic oxide, to have an antireflection effect, a metallic oxide is used as a high refractive-index layer of the multilayer antireflection film, a material selected from the group consisting of $Al_2O_3$, $SiO_2$ and $MgF_2$ is used as a dielectric layer of the multilayer antireflection film, the final layer in contact with the air side being an $MgF_2$ layer, the reflection characteristics of the surfaces of the transparent substrate are reduced by forming a multilayer antireflection film on both sides of the transparent substrate, and the metallic oxide is such that its transmittance gradient is different in short wavelengths and long wavelengths in accordance with the thickness thereof.

According to a further aspect of the present invention, a film is formed by using a mixture formed of two or more types of materials when one high-refractive-index layer of the multilayer antireflection film of the multilayer antireflection film is formed while measuring the spectral reflectance and transmittance of the multilayer antireflection film in a vacuum, and a material of a high refractive-index layer which is being formed or of a high refractive-index layer to be formed next is selected on the basis of the measured value and the film thickness is controlled.

According to the present invention, as described above, since two or more types of metallic oxides having a different refractive index and a different attenuation coefficient are selected as a high refractive-index layer and one or more layers are formed as a single or mixed layer on a transparent substrate, flat transmittance characteristics are realized in a desired wavelength region, in particular, in a visible region.

According to the present invention, since a multilayer film formed of a plurality of layers of a high refractive index layer having an absorbing characteristic and a dielectric film is formed on a transparent substrate, an excellent antireflection effect is obtained.

The above and further objects, aspects and novel features of the invention will more fully appear from the following detailed description when read in connection with the accompanying drawings. It is to be expressly understood, however, that the drawings are for the purpose of illustration only and are not intended to limit the invention.

DESCRIPTION OF THE PREFERRED EMBODIMENTS

It was found that a transparent high-refractive-index film which forms an ordinary antireflection film has a large amount of absorption depending upon the formation conditions thereof. The thin-film-type ND filter of the present invention uses this amount of absorption positively. That is, when $CeO_2$, $HfO_2$, $Pr_2O_3$, $Sc_2O_3$, $Tb_2O_3$, $TiO_2$, $Nb_2O_5$, $Ta_2O_5$, $Y_2O_3$, ZnO, or $ZrO_2$ is formed into a high refractive-index film, a reaction film formation method in an atmosphere of oxygen is employed to promote oxidation degree to obtain a transparent film.

When a film is formed in an ordinary vacuum atmosphere of approximately $10^{-3}$ Pa in which no oxygen gas is introduced, this film is formed into a film having an absorbing characteristic in the wavelength region of the visible region. When a film is formed in a high vacuum atmosphere of, in particular, $10^{-4}$ Pa or less and if an unsaturated oxide is used as a starting material during film formation, the film has a large absorption. In the present invention, flat transmittance characteristics are obtained by selecting these two or more types of the above materials having a different amount of absorption.

Figure 2:
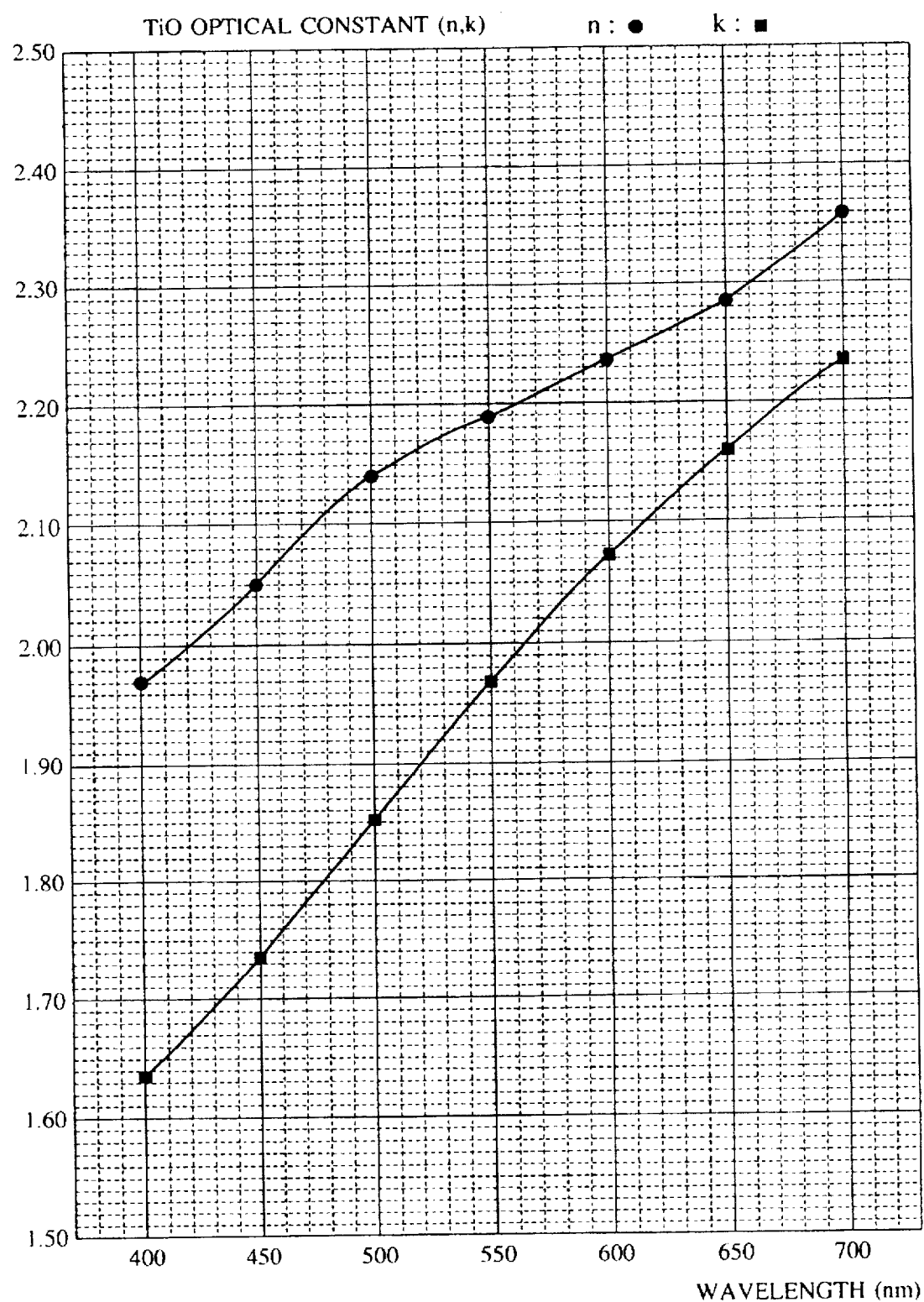
FIG. 2 is a graph illustrating the optical constants of a TiO film.

Next, an explanation will be given using a titanium oxide as a specific example. Materials of unsaturated titanium oxide include TiO, $Ti_2O_3$, $Ti_3O_5$, and $Ti_4O_7$. FIG. 2 shows the refractive index and the attenuation coefficient (optical absorption coefficient) of a film which is vapor deposited in a vacuum using TiO as a starting material. As shown in FIG. 2, both the refractive index and the attenuation coefficient tend to increase from the shorter wavelengths toward the long wavelengths, and their gradient and size are different from those of a Ti metallic film.

Figure 3:
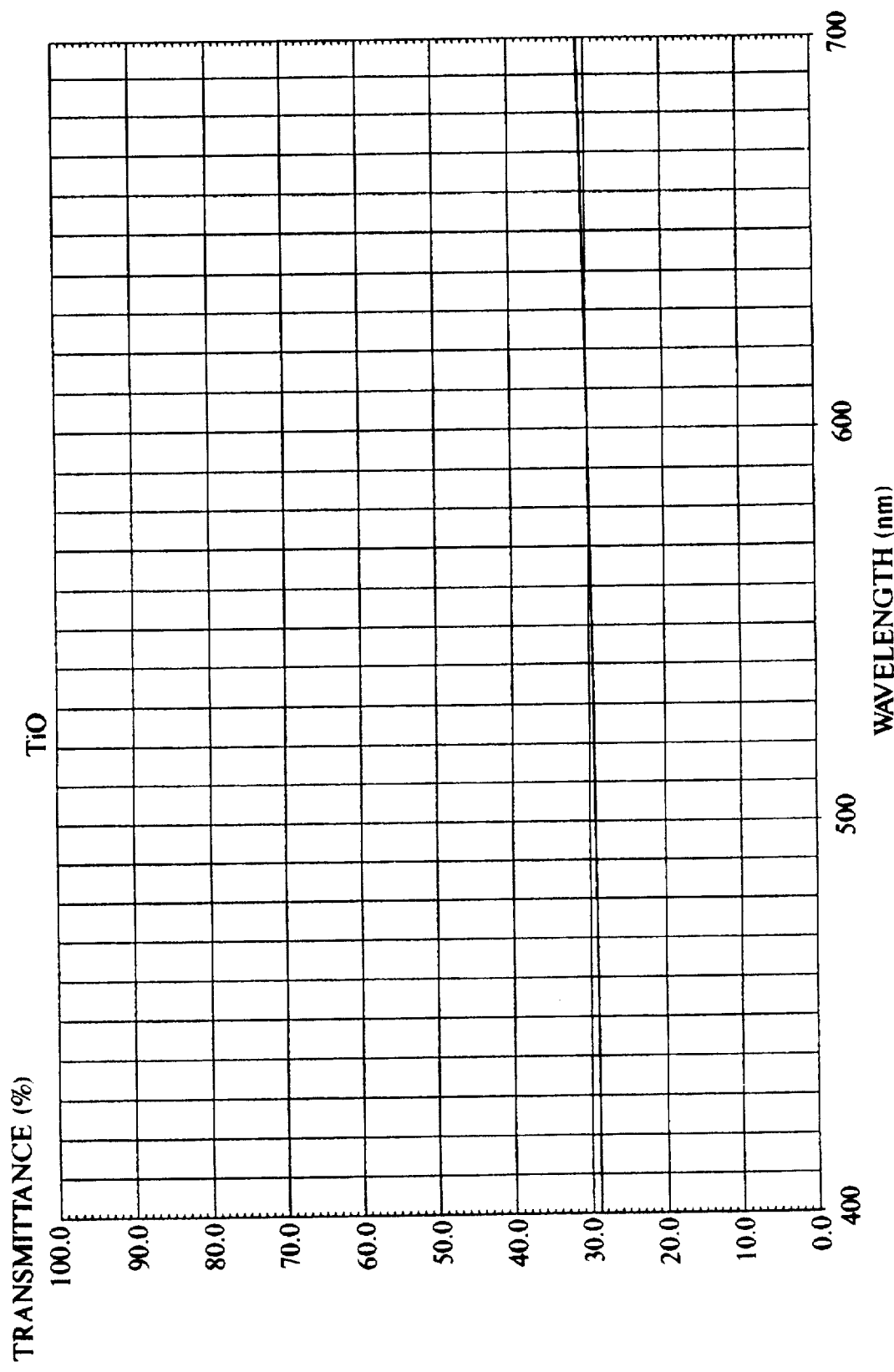
FIG. 3 is a graph illustrating the transmittance characteristics of the TiO film.

FIG. 3 shows the transmittance characteristics when a TiO film having the above-described refractive index and attenuation coefficient is formed into a geometric thickness of 20 nm on a transparent substrate. As shown in FIG. 3, the transmittance is nearly flat, but tend to decrease in shorter wavelengths.

Figure 4:
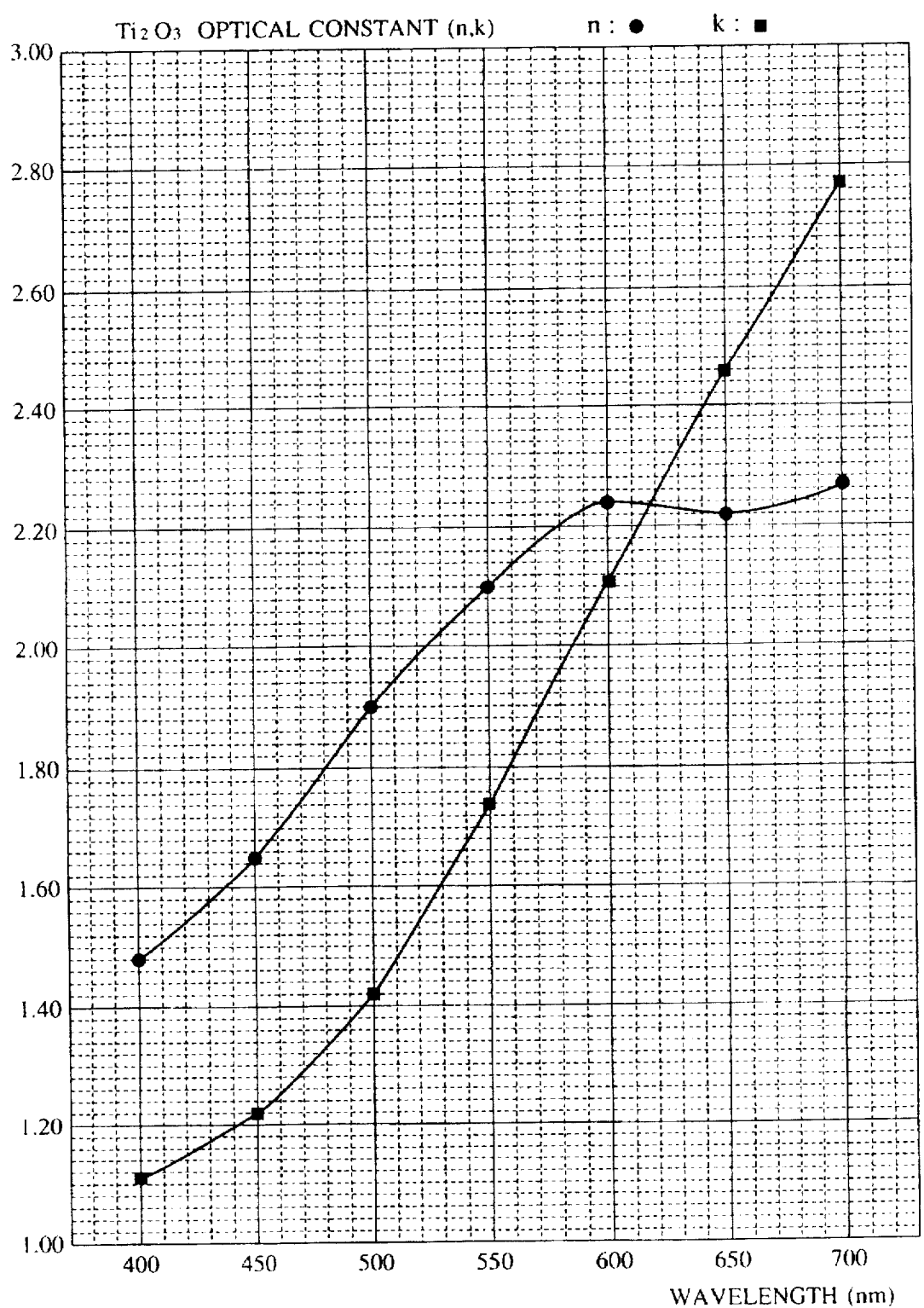
FIG. 4 is a graph illustrating the optical constants of a $Ti_2O_3$ film.
Figure 5:
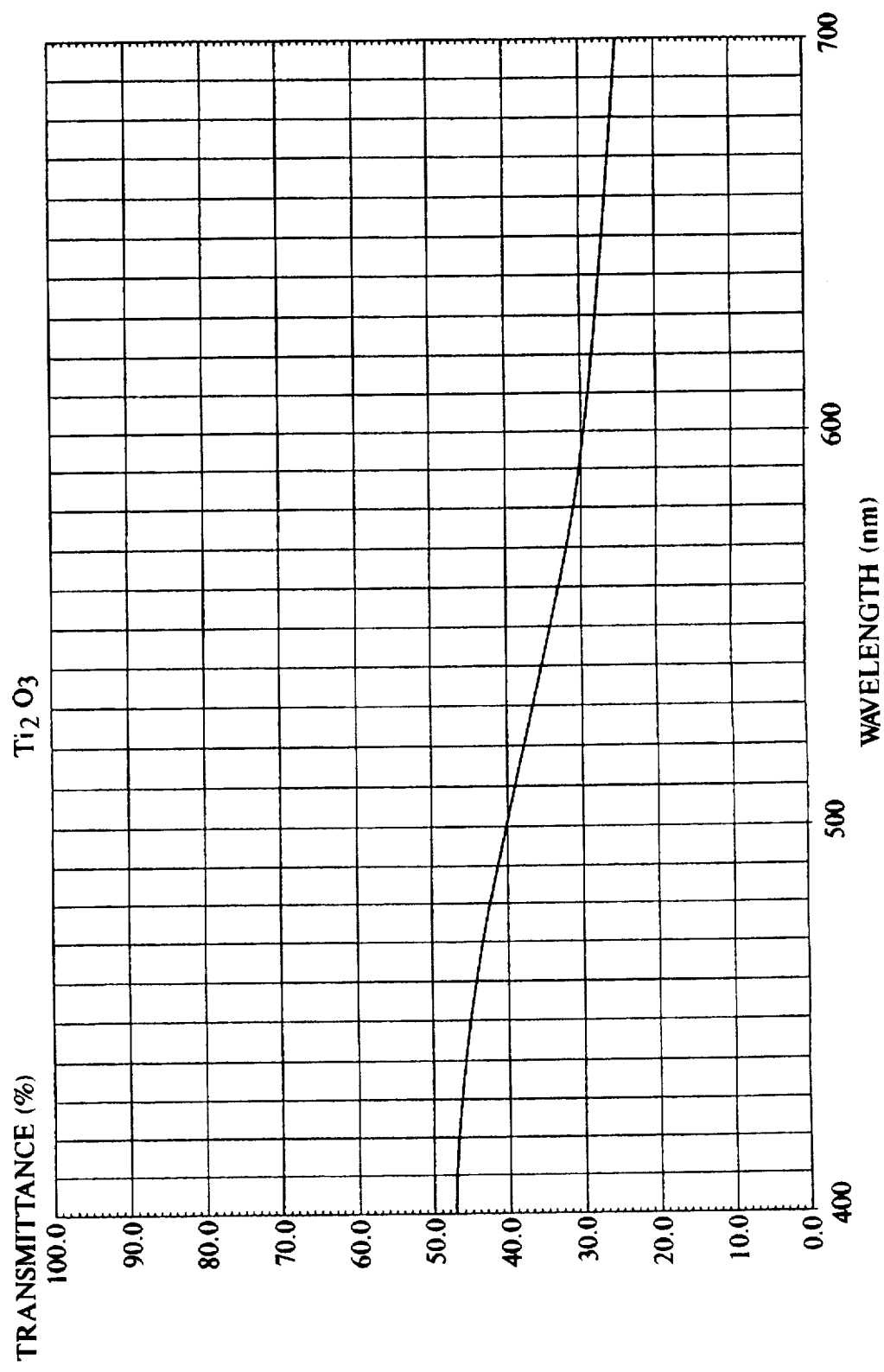
FIG. 5 is a graph illustrating the transmittance characteristics of the $Ti_2O_3$ film.

Further, FIG. 4 shows the transmittance characteristics of a film which is vapor deposited in a vacuum using $Ti_2O_3$ as a starting material. Similarly to the TiO film, both the refractive index and the attenuation coefficient increase from shorter wavelengths to longer wavelengths, though the characteristic tendency is that the magnitude relation between the refractive index and the attenuation coefficient is reversed in the longer wavelengths. When this $Ti_2O_3$ film is formed into the same thickness as that of the TiO film, as shown in the transmittance characteristics of FIG. 5, the transmittance tends to decrease in longer wavelengths. In the present invention, based on the above, flat transmittance characteristics are obtained by using the above two films.

Figure 6A:
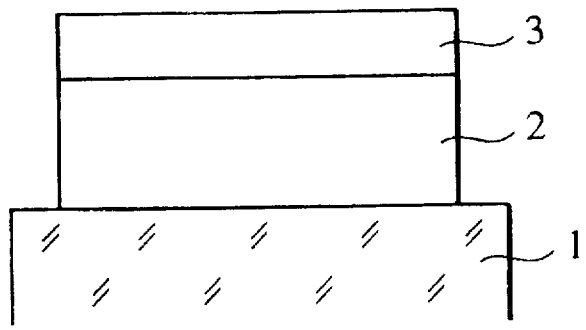
FIGS. 6(A) to 6(C) are illustrations of an example of the structure of a mixed film of TiO and $Ti_2O_3$.
Figure 6B:
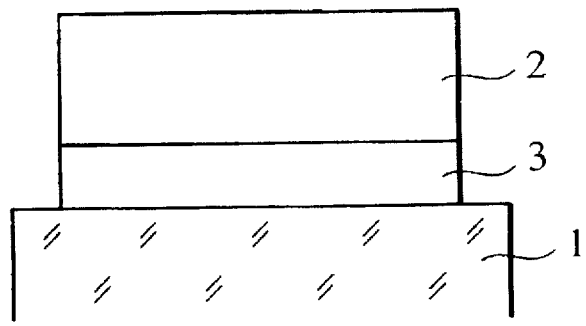
Figure 6C:
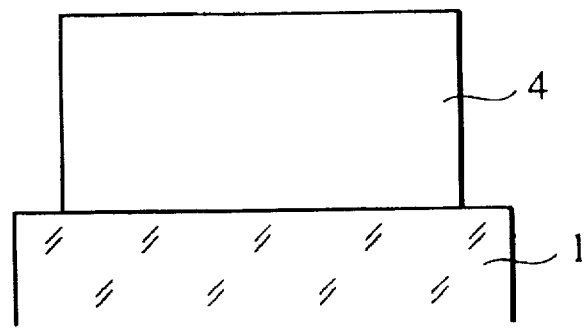

FIG. 6(A) is an illustration of a method of flattening transmittance by forming a $Ti_3O_5$ film 3 after the TiO film 2 is formed as a basic concept example of using the two films. In FIG. 6(A), reference numeral 1 denotes a substrate; reference numeral 2 denotes a TiO; and reference numeral 3 denotes $Ti_2O_3$. In this example, of course, the same advantage can be obtained even if the formation sequence is reversed as shown in FIG. 6(B). FIG. 6(C) is an illustration of a formation example by mixing the materials of the two films. In FIG. 6(C), reference numeral 4 denotes a mixed film. When the materials of the two are mixed in a vacuum vapor deposition method, it is possible to adopt a method in which different materials from a plurality of independent evaporation sources are simultaneously deposited, or a method in which mixed materials including two or more types of materials from a single evaporation source are deposited.

Figure 7:
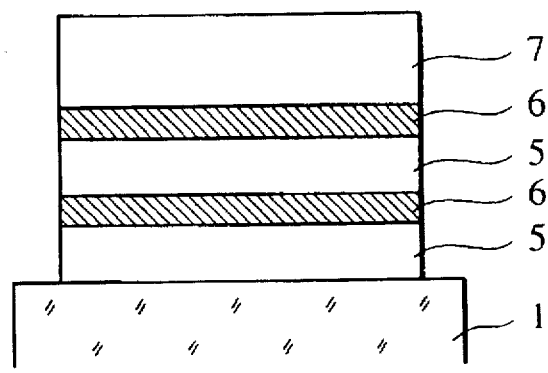
FIG. 7 is an illustration of an example of lamination with a dielectric film.

When it is desired to also obtain an antireflection effect by lamination formed of a plurality of layers including a dielectric layer, as shown in FIG. 7, alternating layers of the dielectric layers 5 and 7, and a metallic oxide having an absorbing characteristic may be formed. Here, it is preferable that the dielectric layers 5 and 7 be an $Al_2O_3$ film, $SiO_2$ film or $MgF_2$ film, and the dielectric layer 7 in contact with the air side, in particular, be an $MgF_2$ film.

A metallic oxide film 6 may be a single TiO film or a single $Ti_2O_3$ film. In this case, however, at least one layer of the plurality of metallic oxide films which form an antireflection film must be formed of a different material. Also, the metallic oxide film 6 may be two or more alternate layers formed of films of different materials shown in FIG. 6(A), or a mixed layer formed of different materials as shown in FIG. 6(C).

Figures 8A, 8B:
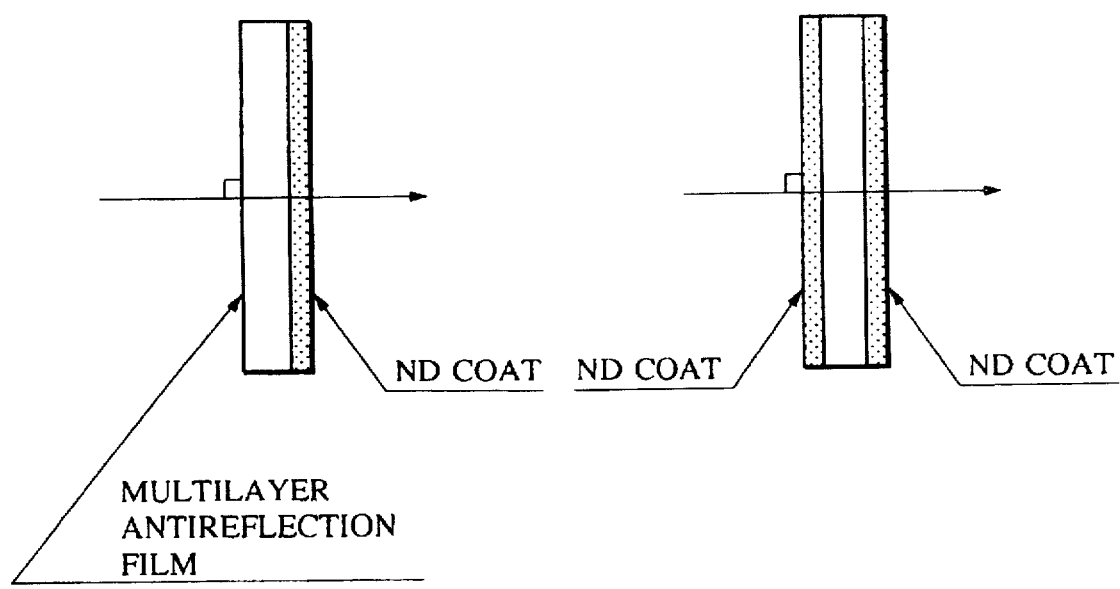
FIGS. 8(A) to 8(B) are illustrations of an example of the shape of an ND filter.

A common configuration of the ND filter is that an ND film is sandwiched between glass so as to be durable. In the present invention, durability is ensured by heating a substrate to 150° C. or above, preferably 200° C. to 300° C., and forming a film. FIG. 8(A) is an illustration of when an ND film is provided on only one surface and an ordinary antireflection film is provided on the other surface. Further, it is preferable in the present invention that an ND film be provided on both surfaces of the substrate to obtain flat transmittance characteristics and an antireflection effect. When this is done, it becomes possible to obtain a higher antireflection effect for incident light from any side of the substrate.

To effectively achieve the advantages of the present invention, the refractive index and the attenuation coefficient in the visible region (400 to 700 nm) of a metallic oxide having an absorbing characteristic is preferably in a range from 1.0 to 3.0.

More specifically, in light with a wavelength close to 400 nm, when the refractive index is 1.0 or less, the metallic oxide shows a property close to a metallic film which shows a high reflectance as an Al or Ag film. Also, when the attenuation coefficient is 3.0 or more, the transmittance in shorter wavelengths tends to decrease sharply in comparison with that in longer wavelengths, making it difficult to flatten the transmittance. In light with a wavelength close to 700 nm, since the refractive index and the attenuation coefficient of the Ti film exceeds 3.0, they should preferably be 3.0 or less to exhibit features of the metallic oxide of the present invention.

Figure 1:
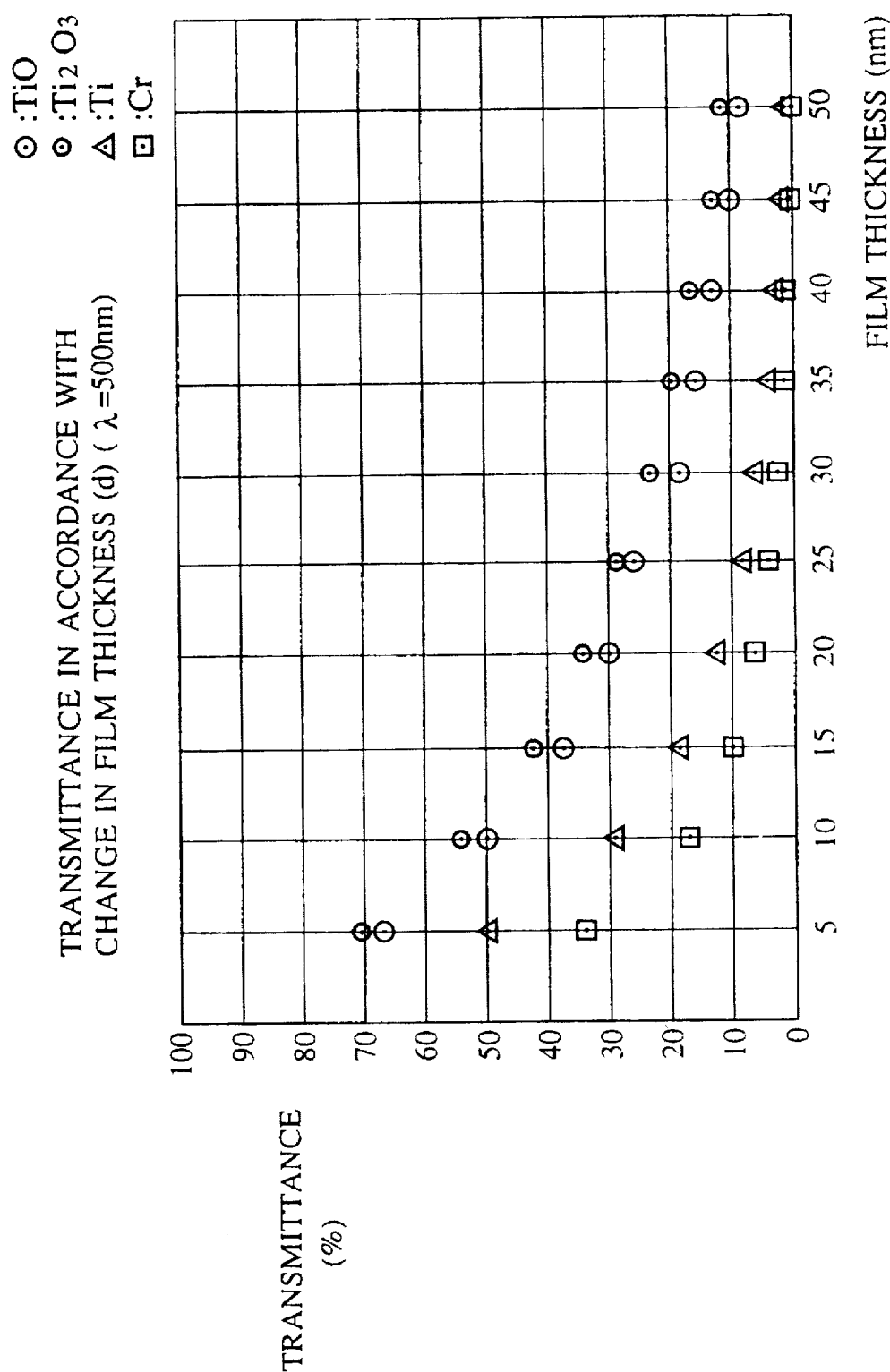
FIG. 1 is a graph illustrating the dependence of transmittance upon film thickness.

As shown in FIG. 1, in the TiO and $Ti_2O_3$ films which form the metallic oxide of the present invention, a change in transmittance with respect to the film thickness is small. For example, to obtain 30% transmittance, it becomes possible to form a film thickness two or three times as great as that of a Ti and Cr film, improving controllability and reproducibility of the film thickness. These advantages are shown to a greater extent, in particular, in a lamination structure combined with a dielectric film and also in a high transmittance type ND filter.

Although a vacuum vapor deposition method is shown as a manufacturing example in the present invention, in addition to this example, an ion plating process using inert gas reactive gas, an ion beam assist process, and a sputtering process may be employed in the present invention. In particular, the sputtering process is effective in forming the mixed metallic oxide film described, above by simultaneously sputtering from different targets or by a sputtering process using a mixed target formed of two or more types of compositions. Also, in the above-described method, it is possible to create various active states by controlling energy of plasma and an ion beam in order to form a metallic oxide having a different degree of oxidation, and it is possible to use a metal, an unsaturated metallic oxide, and a saturated metallic oxide as a starting material.

Figure 9:
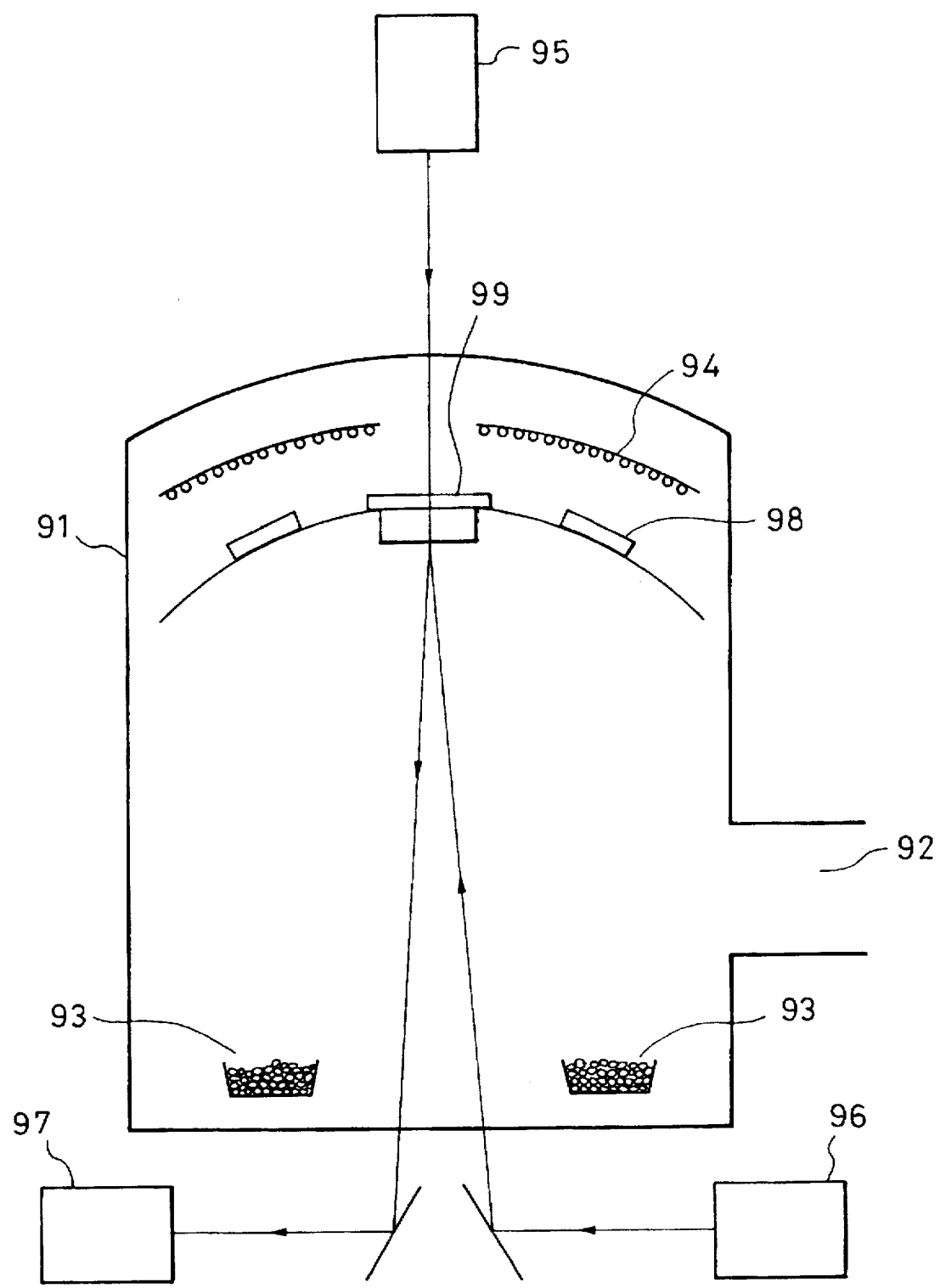
FIG. 9 is a schematic view of a vapor deposition apparatus.

FIG. 9 is an illustration of a method of manufacturing an ND filter by using a vacuum vapor deposition apparatus in accordance with the present invention. In FIG. 9, reference numeral 91 denotes a main body of a vacuum apparatus; reference numeral 92 denotes an exhaust opening; reference numeral 93 denotes an evaporation source such as an electron gun; reference numeral 94 denotes a heater for heating a substrate; reference numeral 95 denotes a light source for transmission; reference numeral 96 denotes a light source for reflection; reference numeral 97 denotes a light receiving section; reference numeral 98 denotes a substrate to be vapor deposited; and reference numeral 99 denotes a monitor substrate for controlling a film thickness. Table 1 shows the film structure in accordance with the present invention.

In a first embodiment, a film is formed on an optical substrate of BK7 with the aim of achieving 20% transmittance. The film is formed of seven layers from the substrate side; M designates an $Al_2O_3$ film, L designates an $MgF_2$ film, the $MgF_2$ film being in contact with air. As for the metallic oxide film, a TiO film and a $Ti_2O_3$ film are selected. Each of them was evaporated from the different evaporation sources 93 shown in FIG. 9, forming the second, fourth and sixth layers. The vacuum degree during formation was $5\times10^{-4}$ Pa, and the substrate temperature was 250° C. Control of film thickness is performed on the basis of the shorter wavelengths of the transmitted and reflected light from the monitor substrate 99, and the spectral intensity in the visible region by using the optical film thickness control apparatuses 95 and 97, and 96 and 97 shown in FIG. 9.

As shown in FIGS. 3 and 8, the TiO film has transmittance characteristics which are more flat than in the visible region. The thickness of the $Ti_2O_3$ film of the sixth layer is determined on the basis of the measurement of the spectral intensity in the visible region when the fifth layer is completed and when the sixth layer is completed so that the transmittance is flattened. It is possible to obtain the characteristics close to the designed value without measuring the spectral intensity. However, by using the above-described method, excellent characteristics are obtained with a still higher degree of reproducibility.

Figure 10:
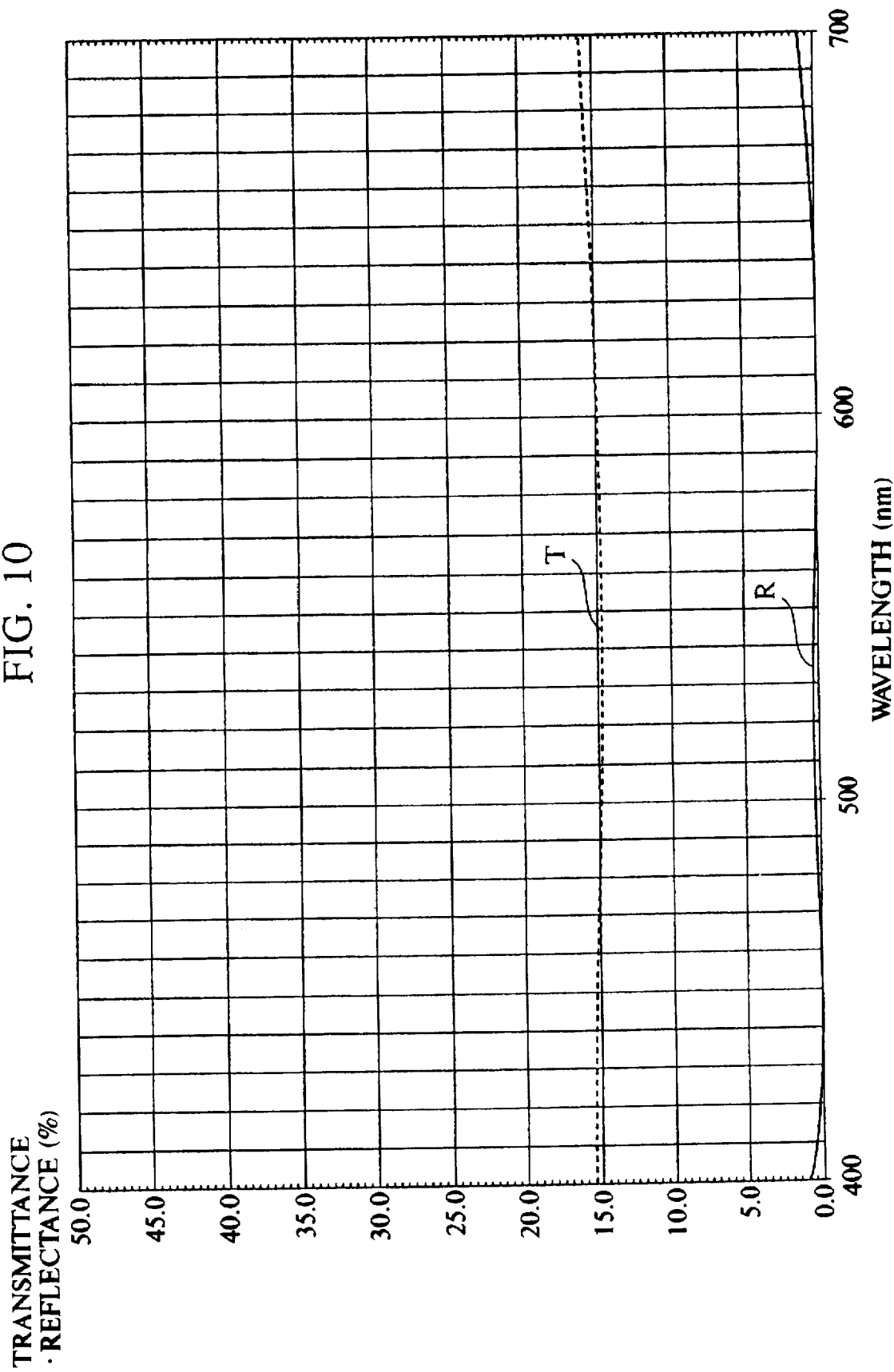
FIG. 10 is a graph illustrating the spectral characteristics in accordance with a first embodiment of the present invention.

FIG. 10 shows the obtained transmittance and reflectance characteristics. Excellent characteristics such that the flatness of the transmittance is ±1% or less, and the reflectance is 1.5% or less in the visible region are obtained.

TABLE 1

| | | | | | (Thickness unit: nm) |
|---|---|---|---|---|---|
| Layer | First Embodiment | | Second Embodiment | | Third Embodiment |
| number from substrate side | Film type | Thickness | Film type | Thickness | Film type | Thickness |
| 1 | M | 151 | M | 103 | M | 103 |
| 2 | TiO | 13 | TiO | 13 | TiO | 5 |
| 3 | M | 51 | M | 67 | M | 74 |
| 4 | TiO | 11 | TiO | 9 | $Ti_xO_y$ | 9 |

TABLE 1-continued (Thickness unit: nm)

| Layer number from substrate side | First Embodiment Film type | Thickness | Second Embodiment Film type | Thickness | Third Embodiment Film type | Thickness |
|---|---|---|---|---|---|---|
| 5 | M | 41 | $Ti_2O_3$ | 4 | M | 65 |
| 6 | $Ti_2O_3$ | 4 | M | 72 | TiO | 5 |
| 7 | L | 65 | TiO | 7 | M | 52 |
| 8 | | | M | 45 | TiO | 5 |
| 9 | | | TiO | 4 | L | 100 |
| 10 | | | L | 104 | | |

Next, a second embodiment of the present invention will be explained. In this embodiment, in the same way as in the first embodiment, an ND filter of a ten layer structure is formed with the aim of achieving 12.5% transmittance. Table 1 shows the film thickness structure. Although the fourth and fifth layers are primarily a single layer, one absorption film is formed by the divided layers of TiO and $Ti_2O_3$ in order to flatten the transmittance. However, since a TiO film is formed in the seventh and ninth layers, film thickness is controlled so that the transmittance in the longer wavelengths shows a low gradient when the fifth layer is completed.

Figure 11:
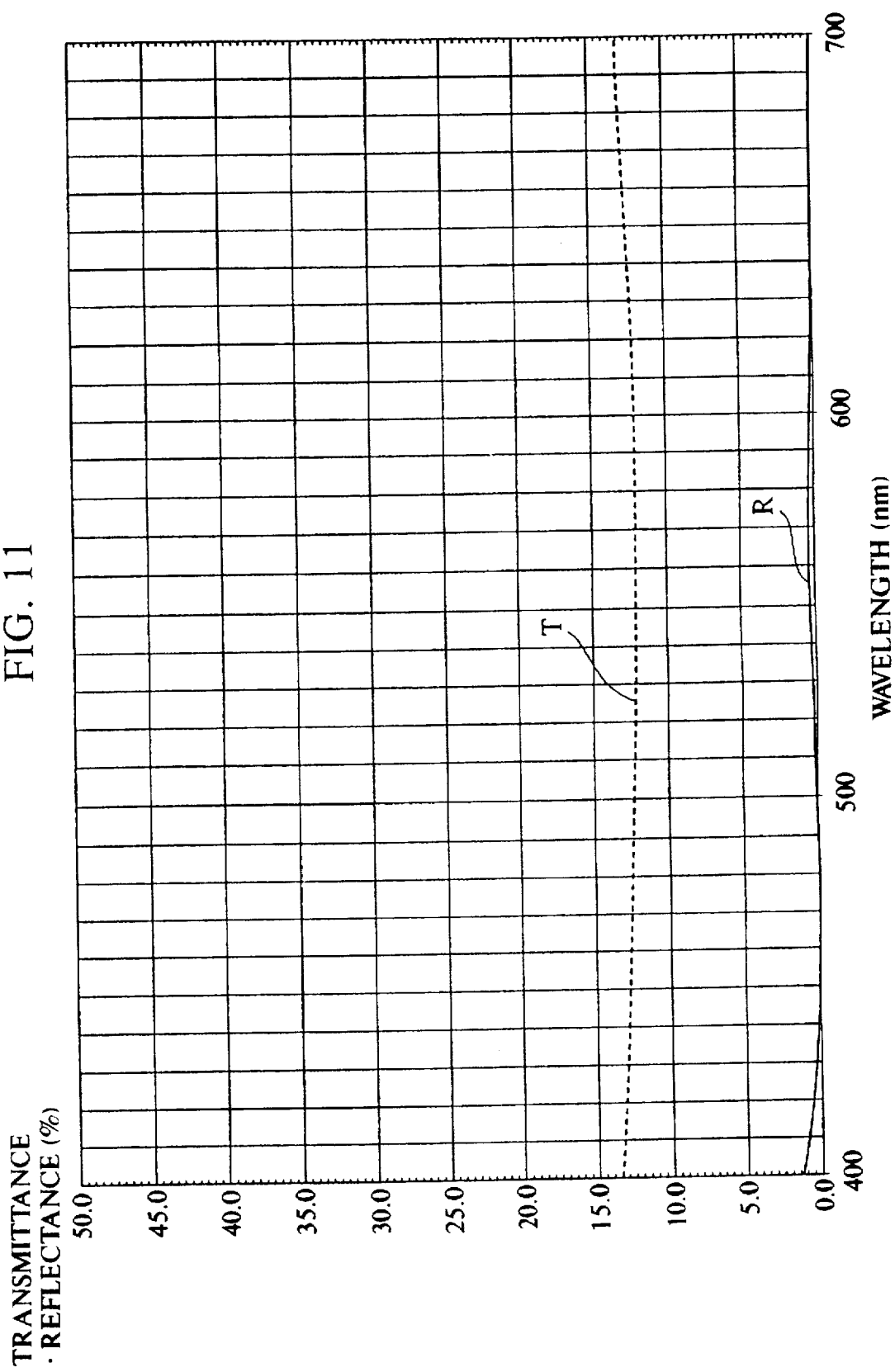
FIG. 11 is a graph illustrating the spectral characteristics in accordance with a second embodiment of the present invention.

FIG. 11 is an illustration of the spectral transmittance of an ND filter in accordance with this embodiment. As shown in FIG. 11, excellent characteristics are obtained such that the flatness of transmittance is ±1% or less and reflectance is 1.5% or less in the visible region.

Next, a third embodiment of the present invention will be explained. In this embodiment, an ND filter of a nine layer structure is formed with the aim of achieving 25.0% transmittance in the same way as in the first embodiment. Table 1 shows the film thickness structure. A mixed film $Ti_xO_y$ of TiO and $Ti_2O_3$ is used in the fourth layer in order to make the transmittance characteristics flat. A mixture of TiO and $Ti_2O_3$ is used as a starting material for a crucible of one electron gun. When the mixture ratio of TiO to $Ti_2O_3$ was examined from 1:1 to 1:5, a ratio of 1:3 was selected as the mixture ratio at which the most appropriate transmittance characteristics can be obtained. The reason why the amount of mixture of $Ti_2O_3$ is large as a starting material is that the vapor pressure of $Ti_2O_3$ is slightly low. In the same way as in the second embodiment, film thickness is controlled so that the transmittance in the slightly longer wavelengths shows a low gradient when the fifth layer is completed in order to form a TiO film in the sixth and eighth layers.

Figure 12:
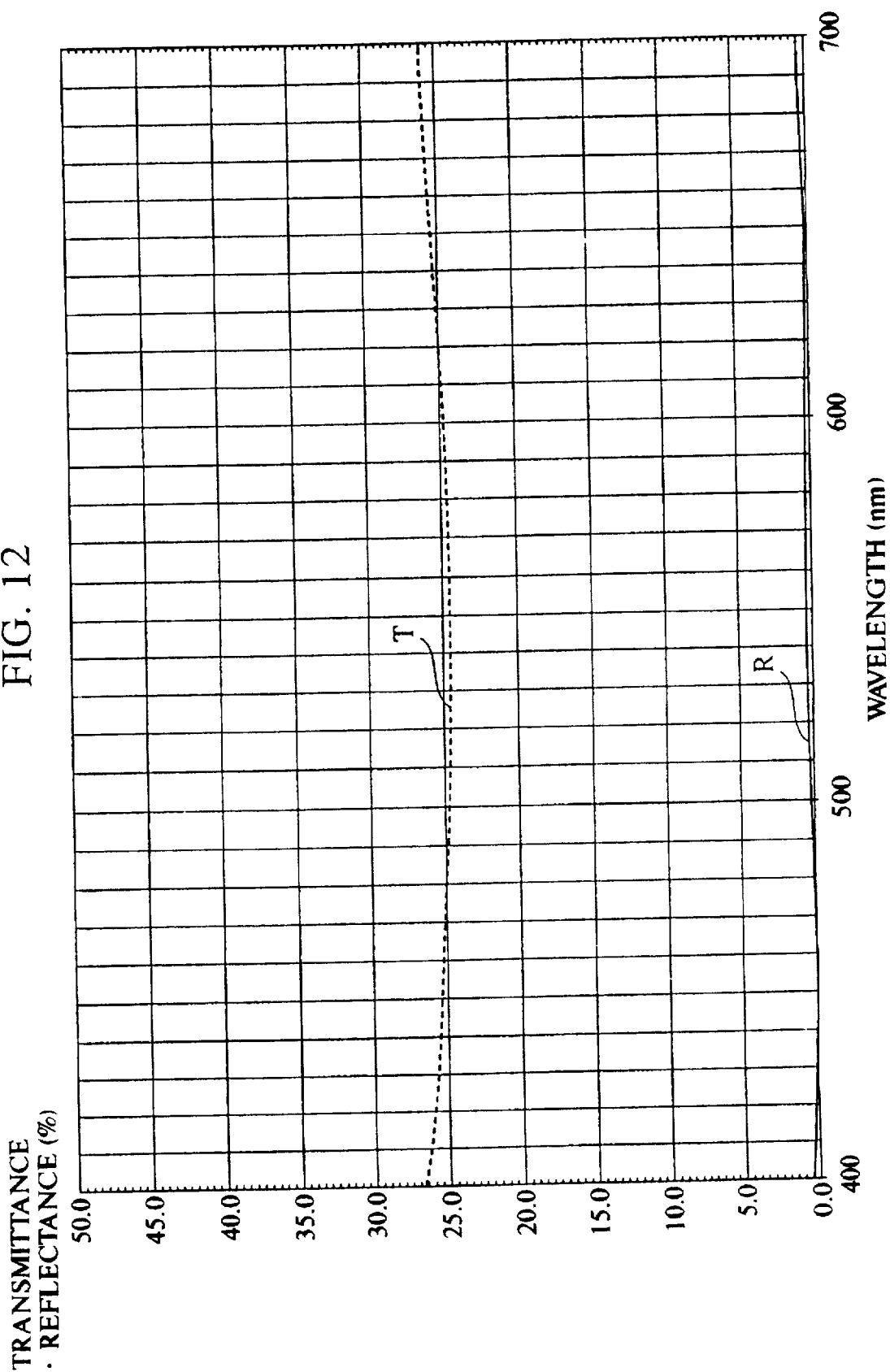
FIG. 12 is a graph illustrating the spectral characteristics in accordance with a third embodiment of the present invention.

As shown in FIG. 12, excellent characteristics are obtained such that the flatness of transmittance is ±1% or less and reflectance is 1.5% or less in the visible region.

Next, a fourth embodiment of the present invention will be explained. As regards the characteristics of the ND filter of the present invention, flat transmittance characteristics in the visible region and an antireflection effect are necessary, and at the same time it is important that the characteristics do not vary with time. In this embodiment, a substrate heating temperature and a dielectric within the film structure were examined to suppress a change over time. In the same way as in the first embodiment, an ND filter of seven layers was formed. However, the substrate heating temperature and the dielectric within the film structure were changed. The conditions and the results are shown in Table 2.

In Table 2, M, S and L designate an $Al_2O_3$ film, an $SiO_2$ film and an $MgF_2$ film, respectively. As regards the evaluation criteria for durability in a test in which a film was left for 500 hours in an environment of a temperature of 45° C. and relative humidity of 95%, a film in which no transmittance varied was designated as ⊚, one in which the average transmittance change in the visible region is less than 2% was designated as ○, and one in which the average transmittance change in the visible region is 2% or more was designated as △. In some of the filters formed at 150° C., except for those filters in which the $SiO_2$ film was used, a very small spot-like change in the exterior occurred, though small in number.

Although the practical necessity of durability depends upon the application and the use environment, and therefore is not definite, the durability designated as ○ or above in Table 2 is more preferable. Also, in order for the ND filter to become stable over time, it is important that the absorbing film itself be stable and at the same time the dielectric film act as a protective film with a high density. In addition, it is preferable that the heating temperature be 150° C. or above, and an $SiO_2$ or $Al_2O_3$ film be used as the dielectric film, except as the final layer.

TABLE 2

| | Embodiments | | | | | Comparative example |
|---|---|---|---|---|---|---|
| | 4-1 | 4-2 | 1 | 4-3 | 4-4 | 5 |
| Layer Structure | M | M | M | L | S | L |
| | TiO | TiO | TiO | TiO | TiO | Ti |
| | M | M | M | L | S | L |
| | TiO | TiO | TiO | TiO | TiO | Ti |
| | M | M | M | L | S | L |
| | $Ti_2O_3$ | $Ti_2O_3$ | $Ti_2O_3$ | $Ti_2O_3$ | $Ti_2O_3$ | Ti |
| | L | L | L | L | L | L |
| Heating temp. (°C.) | Room temp. | 150 | 250 | 150 | 150 | 150 |
| Durability result | △ | ○ | ⊚ | △ | ○ | △ |

According to the present invention, the freedom of design and manufacture with respect to the target characteristics is remarkably increased by using two or more types of metallic oxides having an absorbing characteristic in comparison with a conventional thin-film-type ND filter in which a single metallic film is used. In particular, films formed of materials with a different wavelength-dependent transmittance are used, making it possible to achieve various flat transmittance characteristics in the visible region and antireflection characteristics at specifications superior to those in the prior art. Further, by using a metallic oxide, controllability and reproducibility of the film thickness, which are difficult characteristics from a point of view of manufacturing an ND filter formed of a metallic film and a dielectric film, are improved. Also, since a stable mixed absorbing film can be formed from a mixture of two or more types of materials, and since the spectral transmittance intensity in a vacuum during the formation of an absorbing film formed of a single material and a mixed absorbing film is observed to control the film thickness, a method of manufacturing an ND filter having excellent transmittance characteristics is provided. In addition, since the manufacturing conditions are optimized, it becomes possible to improve durability, making it possible to provide an excellent thin-film-type ND filter by virtue of an antireflection effect produced by forming an ND film on both surfaces.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A neutral density filter, comprising:

a transparent substrate; and a thin film coated on the surface of said substrate, said thin film containing, a first unsaturated oxide, wherein a refractive index and an attenuation coefficient of said first unsaturated oxide increase as wavelength increases, and a magnitude relation concerning the difference between the refractive index and the attenuation coefficient of said first unsaturated oxide is maintained as the wavelength increases, so that transmittance of said first unsaturated oxide increases as the wavelength increases, and a second unsaturated oxide, wherein a refractive index and an attenuation coefficient of said second unsaturated oxide increase as wavelength increases, and a magnitude relation concerning the difference between the refractive index and the attenuation coefficient of said second unsaturated oxide is reversed as the/wavelength increases, so that transmittance of said second unsaturated oxide decreases as the wavelength increases.

2. A neutral density filter according to claim 1, wherein said first and second unsaturated oxides are each a metallic oxide.

3. A neutral density filter according to claim 2, wherein said metallic oxide is a titanium oxide.

4. A neutral density filter according to claim 1, wherein said filter further comprises an outermost layer made of an $MgF_2$ material.

5. A neutral density filter according to claim 1, wherein the refractive index and the attenuation coefficient of each of said first and second substances over the visible region are in the range of 1.0 to 3.

6. A method of manufacturing an ND filter, comprising the steps of:

forming on a transparent substrate a thin film, said thin film containing, a first unsaturated oxide, wherein a refractive index and an attenuation coefficient of said first unsaturated oxide increase as wavelength increases, and a magnitude relation concerning the difference between the refractive index and the attenuation coefficient of said first unsaturated oxide is maintained as the wavelength increases, so that transmittance of said first unsaturated oxide increases as the wavelength increases, and a second unsaturated oxide, wherein a refractive index and an attenuation coefficient of said second unsaturated oxide increase as the wavelength increases, and a magnitude relation concerning the difference between the refractive index and the attenuation coefficient of said second unsaturated oxide is reversed as the wavelength increases, so that the transmittance of said second unsaturated oxide decreases as the wavelength increases; and forming a layer of an $MgF_2$ material in a portion in contact with air in a state in which a temperature of the transparent substrate is maintained at 150° C. or above.

* * * * *

UNITED STATES PATENT AND TRADEMARK OFFICE
CERTIFICATE OF CORRECTION

PATENT NO. : 5,715,103
DATED : February 3, 1998
INVENTOR(S) : Amano et al.

It is certified that error appears in the above-identified patent and that said Letters Patent is hereby corrected as shown below:

<u>COLUMN 9</u>:

Line 27, "the/" should read --the--.

Signed and Sealed this

Twenty-first Day of July, 1998

Attest:

BRUCE LEHMAN

*Attesting Officer*   *Commissioner of Patents and Trademarks*